(12) United States Patent
Kuang et al.

(10) Patent No.: US 9,317,048 B2
(45) Date of Patent: Apr. 19, 2016

(54) CIRCUIT CONTROL SYSTEM AND METHOD FOR DYNAMICALLY ADJUSTING VOLTAGE AND FREQUENCY

(75) Inventors: Shuangge Kuang, Guangdong (CN); Ran Ding, Guangdong (CN)

(73) Assignee: ALLWINNER TECHNOLOGY CO., LTD., Guangdong (CN)

( * ) Notice: Subject to any disclaimer, the term of this patent is extended or adjusted under 35 U.S.C. 154(b) by 178 days.

(21) Appl. No.: 14/238,465

(22) PCT Filed: Sep. 6, 2011

(86) PCT No.: PCT/CN2011/079366
§ 371 (c)(1),
(2), (4) Date: Feb. 11, 2014

(87) PCT Pub. No.: WO2013/023393
PCT Pub. Date: Feb. 21, 2013

(65) Prior Publication Data
US 2014/0191734 A1    Jul. 10, 2014

(30) Foreign Application Priority Data

Aug. 12, 2011    (CN) .......................... 2011 1 0231571

(51) Int. Cl.
*G05F 1/10* (2006.01)
*G05F 1/12* (2006.01)
*G06F 1/32* (2006.01)

(52) U.S. Cl.
CPC *G05F 1/12* (2013.01); *G06F 1/324* (2013.01); *G06F 1/3206* (2013.01); *G06F 1/3296* (2013.01); *Y02B 60/1217* (2013.01); *Y02B 60/1285* (2013.01)

(58) Field of Classification Search
CPC ............... G05F 1/12; G05F 1/10; G06F 1/26; G06F 1/3206; G06F 1/324; G06F 1/3296
See application file for complete search history.

(56) References Cited

U.S. PATENT DOCUMENTS

| 7,418,358 B2 * | 8/2008 | Dolwin ................. G06F 1/3203 702/78 |
| 7,508,276 B2 * | 3/2009 | Beyer ................... H03C 3/0925 331/16 |

(Continued)

FOREIGN PATENT DOCUMENTS

| CN | 1745358 | 3/2006 |
| CN | 1940857 | 4/2007 |

(Continued)

OTHER PUBLICATIONS

International Search Report, PCT/CN2011/079366, Oct. 27, 2011.

*Primary Examiner* — Matthew Nguyen
(74) *Attorney, Agent, or Firm* — Matthew A. Pequignot; Pequignot + Myers LLC

(57) ABSTRACT

Provided are a circuit control system and method for dynamically adjusting voltage and frequency. The circuit control system herein includes: a lookup table module configured to store a combined table of voltage-frequency corresponding relation curves of a target circuit under one or more working conditions; a converting module configured to make conversion between a working voltage and a working frequency of the target circuit according to the lookup table module; and a combined adjusting module configured to combinedly adjust the working frequency and the working voltage of the target circuit. With a high degree of automation, the circuit control system herein is safe and reliable for adjusting the working voltage and the working frequency of the target circuit, thereby achieving the effects of adjustment and optimization.

14 Claims, 7 Drawing Sheets

(56) References Cited

U.S. PATENT DOCUMENTS

| | | | |
|---|---|---|---|
| 7,541,879 B2* | 6/2009 | Kato | H03C 3/09 327/156 |
| 7,774,625 B1 | 8/2010 | Sheng et al. | 713/300 |
| 2008/0104423 A1 | 5/2008 | Boecker et al. | 713/300 |
| 2010/0188115 A1 | 7/2010 | Von Kaenel | 326/16 |
| 2015/0006915 A1* | 1/2015 | Ganesan | G06F 1/26 713/300 |

FOREIGN PATENT DOCUMENTS

| | | | |
|---|---|---|---|
| CN | 101174159 | 5/2008 | |
| WO | 2004/061635 | 7/2004 | |
| WO | 2011003083 | 1/2011 | G06F 1/32 |

\* cited by examiner

CIRCUIT CONTROL SYSTEM AND METHOD FOR DYNAMICALLY ADJUSTING VOLTAGE AND FREQUENCY

RELATED APPLICATION DATA

This application is the national stage entry of International Appl. No. PCT/CN2011/079366, filed Sep. 6, 2011, which claims priority to Chinese Patent Application No. CN 201110231571.2, filed Aug. 12, 2011. All claims of priority to these applications are hereby made, and each of these applications is hereby incorporated in its entirety by reference.

TECHNICAL FIELD

The present disclosure relates to the technical field of circuit control, and more particularly to a circuit control system and method for dynamically adjusting voltage and frequency, which dynamically adjust the working voltage and working frequency of a target circuit.

BACKGROUND OF THE INVENTION

As is known to all, if an integrated circuit can be designed to have a lower power consumption, a lower packaging cost, a lower power cost, a lower cooling cost and a higher reliability will be obtained, thereby improving the competitiveness of products.

There are meanings in two aspects for reducing the power consumption of a circuit (hereafter referred to as target circuit); one aspect is to reduce the dynamic power consumption of the target circuit under the working condition, and the other aspect is to reduce the static power consumption of the target circuit under the non-working condition. The working voltage and working frequency required by the target circuit under the working condition and those under the non-working condition are different. If the working condition is further refined, the working voltage and working frequency required by the target circuit are different for different application scenarios. If the working voltages and working frequencies of the target circuit under different working conditions can be dynamically adjusted, then, when the target circuit executes simpler tasks/programs (or under non-working conditions), the working voltage and working frequency thereof will be reduced, and when the target circuit executes more complicated tasks/programs, the working voltage and working frequency thereof will be increased, so that the total power consumption of the target circuit will be reduced effectively under the premise of ensuring the original performance of the target circuit not reduced.

It is very complicated to adjust the voltage and frequency of the target circuit by the conventional system for controlling working voltage and working frequency. The conventional system mainly adopts software, especially the operating system, to analyze the task or application program to be executed, so as to acquire the working voltage and working frequency required to execute the task; the conventional system adjusts the working voltage and working frequency of the target circuit through software prior to executing the task, and the task or application program will not be executed until the voltage and frequency are adjusted to the required values. This kind of adjusting method by the conventional system mainly relies on software, and the adjusting module is divided into a plenty of independent configurations, as a result, the adjusting process is rather complicated, the adjusting time length gets longer, and the burden of the software program is increased greatly.

When adjusting the voltage and frequency of the target circuit by the conventional system for dynamically controlling working voltage and working frequency, the adjusting efficiency is lower, which is mainly reflected in that: the working voltage is increased when the target circuit is required to work at a higher frequency, or the working voltage is reduced when the target circuit is required to work at a lower frequency, wherein, the standard of increasing or reducing the working voltage is unified without differentiating the manufacturing process differences or the working environment differences of the target circuit. In fact, the target circuit under different working conditions requires different minimum voltages at the same working frequency. If the system for dynamically controlling the working voltage and working frequency does not differentiate the manufacturing process differences or the working environment differences of the target circuit, only the higher voltage can be adopted as the unified adjusting standard, as a result, the working voltage cannot be lowered as much as possible. Therefore, the conventional system for dynamically controlling working voltage and working frequency cannot realize the most optimized energy saving solution.

The conventional system for dynamically controlling the working voltage and working frequency adopts a simple and direct method when adjusting the voltage and frequency of the target circuit. In order to achieve the effect of reducing the number of adjusting configurations and reducing the burden of the software, the conventional system for dynamically controlling working voltage and working frequency normally adopts a one-step method to adjust the voltage or frequency of the target circuit, which cannot prevent the system from being impacted due to the rapid change of the voltage or frequency; as a result, the conventional system cannot leave enough buffering time for switching system status, or, the running of the target circuit has to be interrupted during buffering. Therefore, the conventional system for controlling the working voltage and working frequency is not safe and fast enough.

SUMMARY OF THE INVENTION

In view of the defects existing in the prior art, the present disclosure provides a circuit control system and method for dynamically adjusting voltage and frequency. With a high degree of automation, the system and method of the present disclosure are safe and reliable for adjusting the working voltage and working frequency of the circuit, thereby achieving the effects of adjustment and optimization.

In one aspect, the present disclosure provides a circuit control system for dynamically adjusting voltage and frequency, including a lookup table module, a converting module and a combined adjusting module, wherein:

the lookup table module is configured to store a combined table of voltage-frequency corresponding relation curves of a target circuit under one or more working conditions;

the converting module is configured to make conversion between a working voltage and a working frequency of the target circuit according to the lookup table module; and the combined adjusting module is configured to combinedly adjust the working voltage and the working frequency of the target circuit.

Preferably, the circuit control system for dynamically adjusting voltage and frequency further includes a scanning module, configured to scan a working behavior of the target circuit under a current condition;

the scanning module is capable of scanning for status of the working behavior of the target circuit under the current condition, and according to a result of the scanning for status, selecting a voltage-frequency corresponding relation curve of the target circuit under the current condition from the lookup table module.

Preferably, the circuit control system for dynamically adjusting voltage and frequency further includes a combined control module, configured to execute combined control on adjustment of the working voltage and the working frequency of the target circuit;

the combined control module controls the lookup table module, the scanning module, the converting module and the combined adjusting module, and at an end of combined adjustment of the working voltage and the working frequency of the target circuit, the combined control module outputs an adjusting result and informs said adjusting result to a user.

In another aspect, the present disclosure provides a circuit control method for dynamically adjusting voltage and frequency, including following steps:

step A, scanning for status of a working behavior of a target circuit under a current condition, and according to a result of the scanning for status or directly according to a preset result, selecting a voltage-frequency corresponding relation curve for the target circuit under the current condition from a lookup table;

step B, under the current condition, when said target circuit executes a working task, acquiring a target frequency value required to execute said working task, and according to said target frequency value and said voltage-frequency corresponding relation curve selected for said target circuit, computing a target voltage value required to execute said working task; and step C, according to a relative difference between a frequency value of said target circuit under the current condition and the target frequency value, and according to a relative difference between a voltage value of the target circuit under the current condition and the target voltage value, combinedly adjusting the working voltage and the working frequency of said target circuit in a preset sequence smoothly.

The circuit control system and method for dynamically adjusting voltage and frequency of the present disclosure have following advantages: with a high degree of automation, when combinedly adjusting the working voltage and the working frequency of the target circuit, the complexity of the circuit will not be increased; the adjustment of the working voltage and working frequency of the circuit is safe and reliable with a sufficient consideration of the safety and rapidness of the adjustment; furthermore, the circuit control system herein is capable of increasing the working frequency of integrated circuit chips at a limited working voltage in different working scenarios, and the working performance of the target circuit can be fully exploited, thereby acquiring a better working experience. The circuit control system of the present disclosure can adjust the target circuit according to processing characteristics of the target circuit, and working behaviors and power consumption characteristics of the target circuit in different applications, thereby achieving the most optimized energy saving effect.

PREFERRED EMBODIMENTS OF THE INVENTION

In order to make the purpose, technical solutions and advantages of the present disclosure to be understood more clearly, the present disclosure will be described in further details with the accompanying drawings and the following embodiments. It should be understood that the specific embodiments described herein are merely examples to illustrate the disclosure, not to limit the present disclosure.

Figure 1:
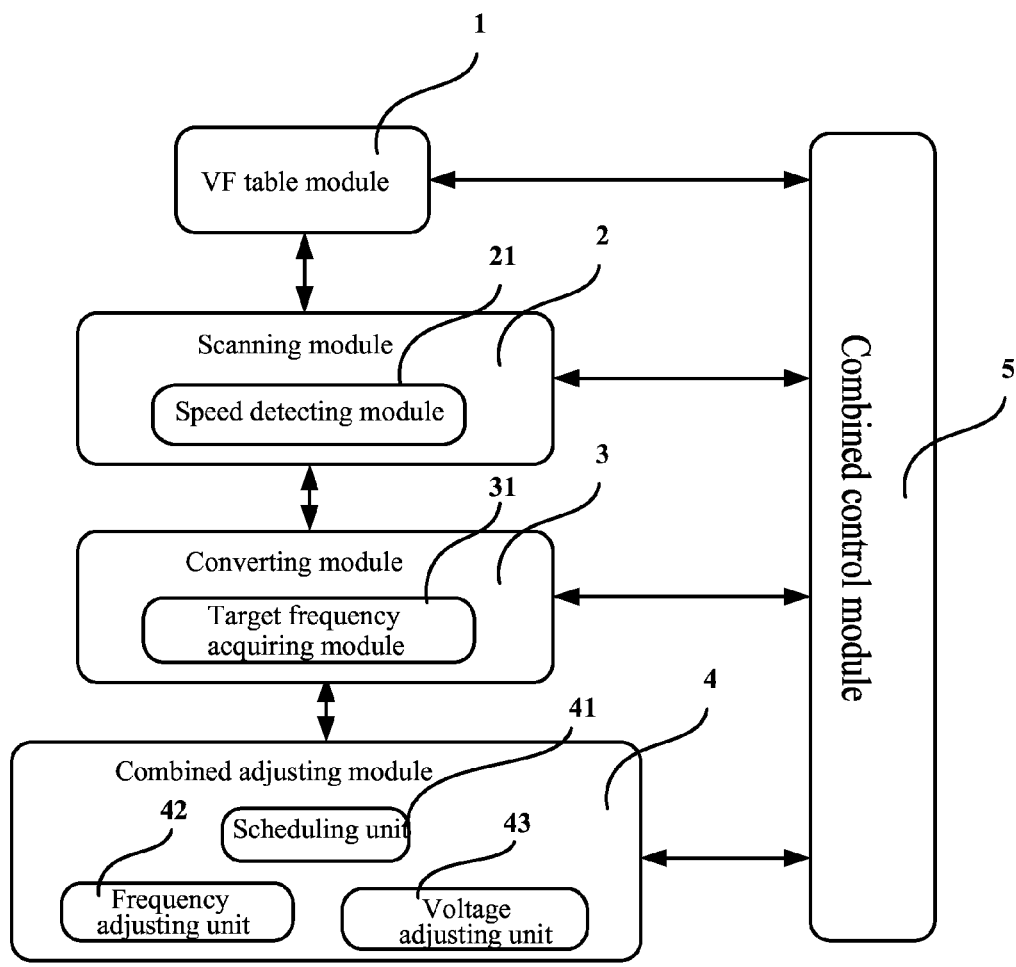
FIG. 1 is a structure diagram illustrating the circuit control system for dynamically adjusting voltage and frequency according to one embodiment of the present disclosure.

Preferably, according to one embodiment of the present disclosure as shown in FIG. 1, the circuit control system for dynamically adjusting voltage and frequency includes a lookup table module 1, a scanning module 2, a converting module 3, and a combined adjusting module 4.

Wherein, the lookup table module 1 is configured to store the working condition lookup table (VF table) for the working behavior of the target circuit.

The working condition lookup table (VF table) is a combined table containing voltage-frequency corresponding relation curves of the target circuit under multiple working conditions.

The multiple working conditions include but not limited to different manufacturing process errors and different working temperatures.

The scanning module 2 is configured to scan the working behavior of the target circuit under the current condition.

The scanning module 2 is capable of scanning for status of the working behavior of the target circuit under the current condition, and according to a result of the scanning for status, selecting a voltage-frequency corresponding relation curve of the target circuit under the current condition from the lookup table module 1.

Preferably, according to one embodiment of the present disclosure, the scanning module 2 includes a speed detecting circuit 21, configured to scan for status of the working behavior of the target circuit under a preset condition; namely the speed detecting circuit is configured to detect the maximum working frequency of the target circuit under the current condition (for example, at a preset voltage or a preset temperature), or detect the minimum working voltage of the target circuit under the current condition (for example, at a preset frequency or a preset temperature).

The converting module 3 is configured to make conversion between a working voltage and a working frequency of the target circuit according to the lookup table module 1.

When the target circuit executes a working task under the current condition, the converting module 3 acquires the target frequency value required to execute the working task, and according to the target frequency value and the voltage-frequency corresponding relation curve selected by the scanning module 2, the converting module 3 computes the target voltage value required to execute the working task.

The combined adjusting module 4 is configured to combinedly adjust the working voltage and the working frequency of the target circuit.

The combined adjusting module 4, according to the relative difference between the current frequency value of the target circuit and the target frequency value, and the relative difference between the current voltage value of the target circuit and the target voltage value, combinedly adjusting the working voltage and the working frequency of the target circuit in a preset sequence smoothly.

Preferably, according to one embodiment of the present disclosure, the combined adjusting module 4 includes a scheduling unit 41, a frequency adjusting unit 42 and a voltage adjusting unit 43.

The scheduling unit 41 is configured to call the frequency adjusting unit 42 and the voltage adjusting unit 43 to combinedly adjust the working voltage and the working frequency in a preset sequence smoothly.

The frequency adjusting unit 42 is configured to smoothly adjust the working frequency of the target circuit by means of adjusting the clock source selection, source frequency, frequency division coefficient, clock gating of the target circuit, and so on.

By means of smoothly adjustment, the harmful impacts to the clock system and the power supply system will be lowered as much as possible.

The voltage adjusting unit 43 is configured to adjust the voltage of the power supply system of the target circuit in a preset sequence.

Preferably, the circuit control system for dynamically adjusting voltage and frequency further includes a combined control module 5, configured to execute combined control on adjustment of the working voltage and the working frequency of the target circuit.

The combined control module 5 controls the lookup table module 1, the scanning module 2, the converting module 3 and the combined adjusting module 4, and at the end of combinedly adjusting the working voltage and the working frequency of the target circuit, said combined control module outputs an adjusting result and informs said adjusting result to a user.

The lookup table module 1 configured to store the working condition lookup table (VF table) for the working behavior of the target circuit according to one embodiment of the present disclosure will be described in details as follows.

The working behavior of the target circuit refers to that, with regard to the target circuit, because of individual differences generated in manufacturing process, or differences of being in different working conditions such as different temperatures, or differences generated by influence of different peripheral components such as different printed circuit boards, each individual target circuit represents different behavior in practical work. The overall behavior range, acquired by statistical processing of behaviors of a limited number of target circuits, is called working behavior of the target circuit.

Preferably, according to one embodiment of the present disclosure, with regard to each individual target circuit, its behavior in practical work can be acquired by actual measurements.

The working condition lookup table (VF table) refers to a table of the voltage-frequency corresponding relation curves generated by quantizing the behavior of the target circuit. With regard to each individual target circuit, its behavior in practical work is quantized by measuring the maximum working frequency required for normal running of the target circuit under several certain voltages, or measuring the minimum working voltage required for normal running of the target circuit at several certain frequencies; and then a voltage-frequency corresponding relation curve, which takes working frequencies and working voltages as coordinates, can be acquired by statistical processing. Since multiple times of implements or multiple different implements of the target circuit may cause differences in behavior, a table of multiple voltage-frequency corresponding relation curves will be obtained, namely the VF table as shown in FIG. 1, which covers the overall behavior range of the target circuit.

| FIG. 1 Table of voltage-frequency corresponding relation curves | | | | |
|---|---|---|---|---|
| Voltage/Frequency (Mhz) | Curve 1 | Curve 2 | Curve 3 | Curve 4 |
| 0.8 v | 260 | 240 | 200 | 200 |
| 0.9 v | 310 | 300 | 280 | 270 |
| 1.0 v | 350 | 320 | 300 | 290 |
| 1.1 v | 400 | 370 | 360 | 350 |
| 1.2 v | 430 | 410 | 400 | 390 |
| 1.3 v | 480 | 440 | 430 | 420 |
| 1.4 v | 540 | 504 | 480 | 460 |

The working condition lookup table, namely the VF table, contains multiple voltage-frequency curves, which respectively correspond to multiple different behaviors of the Integrated Circuit (IC). Each point on the curves defines the maximum working frequency required for normal running of the target circuit under a specific voltage.

Figure 2:
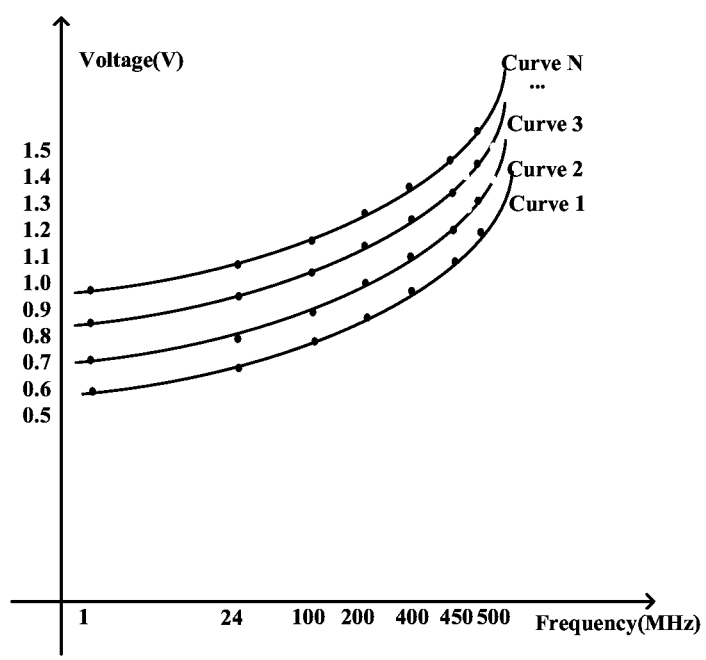
FIG. 2 is a diagram illustrating the working condition lookup table according to one embodiment of the present disclosure.

As shown in FIG. 2, the minimum working voltages of different curves at the same frequency are different; wherein, in curve 1 at the point that working frequency is 500 MHz, the corresponding minimum working voltage is 1.3V; and in curve 2 at the point that working frequency is 500 MHz, the corresponding minimum working voltage is 1.4V.

With regard to an implement of the target circuit in an application scenario, if its behavior matches curve 1, when the working frequency is 500 MHz, the allowed minimum voltage is 1.3V. With regard to an implement of the target circuit in another application scenario, if its behavior matches curve 2, when the working frequency is 500 MHz, the allowed minimum voltage is 1.4V.

Preferably, according to one embodiment of the present disclosure, data of the VF table are acquired by means of actual measurement of a large number of implements of the target circuit.

Preferably, according to one embodiment of the present disclosure, the measuring process to the target circuit is as follows: scanning for the boundary of the maximum frequency of the target circuit (IC) at a certain voltage, and when the maximum working frequency of the target circuit is determined, a certain amount (a preset quantity) of margins are reserved, and by means of long-time stability tests, the maximum frequency of the target circuit at this voltage can be obtained; alternatively, scanning for the boundary of the minimum voltage of the target circuit at a certain frequency, and when the minimum working voltage of the target circuit is determined, a certain amount of margins are reserved, and by means of long-time stability tests, the minimum voltage of the target circuit at this frequency can be obtained.

Figure 3:
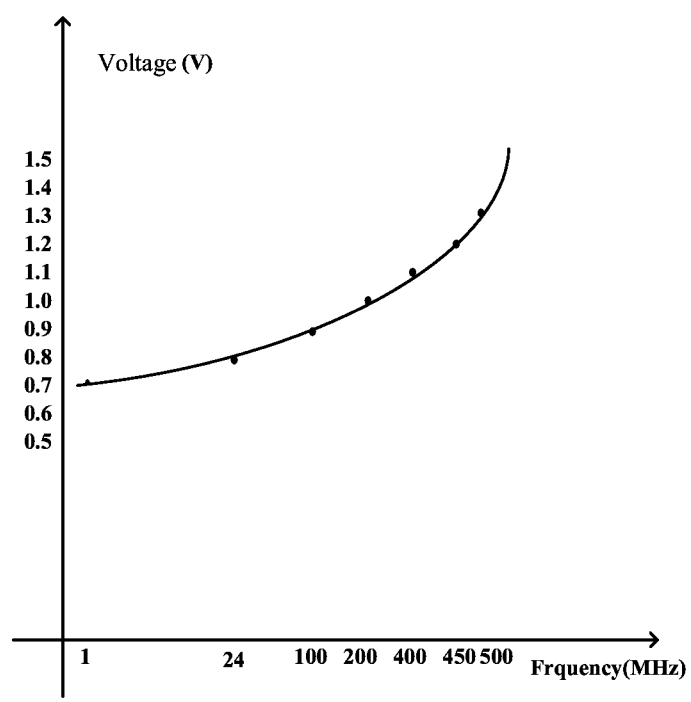
FIG. 3 is a diagram illustrating the corresponding relation between the frequency and the voltage.

The two kinds of measurement methods can be converted to each other, and both methods can obtain a voltage-frequency corresponding relation point as shown in FIG. 3.

A voltage-frequency corresponding relation curve of the target circuit under a preset working condition can be obtained by detecting maximum frequencies of the target circuit at multiple voltages or detecting minimum voltages of the target circuit at multiple frequencies.

When testing the target circuit under different working conditions, or measuring the voltage-frequency corresponding relation curves for different implements of the target circuit under certain working conditions, many different voltage-frequency corresponding relation curves are acquired; the many different voltage-frequency corresponding relation curves herein are combined and composed statistically, thereby acquiring several voltage-frequency curves as the voltage-frequency corresponding relation curves of the target circuit, and the voltage-frequency corresponding relation curves herein are stored to form the lookup table module, namely the VF table module.

Preferably, according to one embodiment of the present disclosure, data of the voltage-frequency corresponding relation curves stored in the lookup table module 1 is imported and stored in a solid-state storage device of the circuit control system of the present disclosure at the initialization stage of the system.

The scanning module 2 according to one embodiment of the present disclosure will be described in details as follows:

The scanning module 2 scans for status of the working behavior of the target circuit under the current condition, and according to a result of the scanning for status, selects a voltage-frequency corresponding relation curve of the target circuit under the current condition from the lookup table module 1.

Preferably, according to one embodiment of the present disclosure, the scanning module 2 includes a speed detecting circuit 21, configured to scan for status of the working behavior of the target circuit under a preset condition; namely the speed detecting circuit is configured to detect the maximum working frequency of the target circuit under the current condition (for example, at a preset voltage or a preset temperature), or detect the minimum working voltage of the target circuit under the current condition (for example, at a preset frequency or a preset temperature).

Preferably, according to one embodiment of the present disclosure, with regard to the speed detecting circuit, A) a result whether the speed detecting circuit is able to work normally or not able to work normally can be obtained by adjusting the voltage, or adjusting the frequency, or adjusting the delay path (or other factors) of the target circuit; or B) the result whether the speed detecting circuit is able to work normally or not able to work normally does not affect the normal running of the target circuit; or C) by making conversion, the result whether the target circuit is able to work normally or not able to work normally under a second setting condition can be computed from the result whether the speed detecting circuit is able to work normally or not able to work normally under a first setting condition; or D) according to different characteristics of the speed detecting circuit, the first setting condition and the second setting condition may be the same condition or different conditions.

Preferably, according to one embodiment of the present disclosure, the conversion relation can be obtained by a limited number of statistical measurements.

Preferably, according to one embodiment of the present disclosure, the speed detecting circuit 21 of the scanning module can be implemented by various kinds of means, for example, by means of fixing the number of stages of the delay circuit (or fixing the operational circuit) and adjusting the frequency of the input clock, or by means of fixing the input frequency and adjusting the number of stages of the delay path, and so on.

Figure 4:
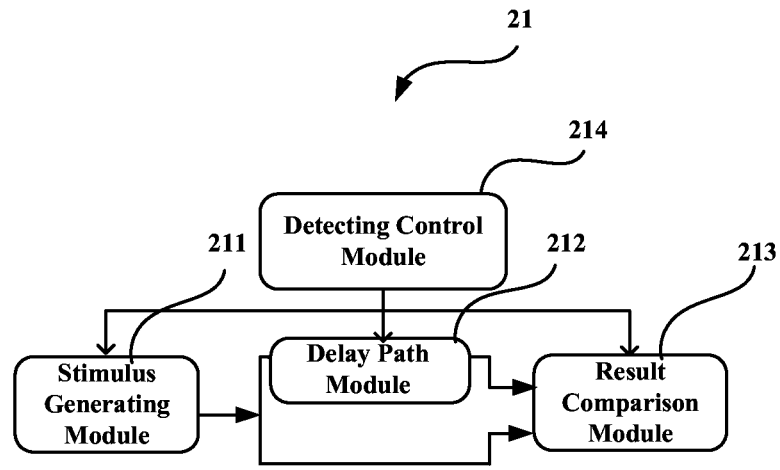
FIG. 4 is a structure diagram illustrating the speed detecting circuit as shown in FIG. 1.

Preferably, according to one embodiment of the present disclosure as shown in FIG. 4, the speed detecting circuit 21 of the scanning module detects the working behavior of the target circuit by means of adjusting the delay path length of the speed detecting circuit with the set working voltage and set working frequency (namely fixing the input frequency), and judging the working result thereof.

The number of delay stages is acquired by the speed detecting circuit, and by means of judging the section of value range (the section of value range is classified and divided statistically) where the number of delay stages locates in, the voltage-frequency corresponding relation curve select bit of the current target circuit is acquired correspondingly, namely one of the multiple curves in the lookup table (VF table) module is taken as the voltage-frequency corresponding relation curve of the current target circuit.

FIG. 4 is a diagram illustrating the structure of the speed detecting circuit 21 according to one embodiment of the present disclosure. Wherein, the speed detecting circuit 21 contains a stimulus generating module 211, a delay path module 212, a result comparison module 213, and a detecting control module 214.

The stimulus generating module 211 is configured to generate one or more multi-periodic pulse signals (such as a pulse signal with 50% duty ratio) according to an input clock signal, and the pulse signals pass two different path circuits, which are a non-delay path circuit and a delay path circuit of the delay path module 212, and then arrive at the result comparison module 213 respectively.

The delay path module 212, containing the delay path circuit, is configured to delay pulse signals, or compute input signals.

The result comparison module 213 is configured to compare between the phase of the pulse signal having passed the non-delay path circuit and that of the pulse signal having passed the delay path circuit.

And the detecting control module 214 is configured to, in different time sequences, control the stimulus generating module 211, the delay path module 212, and the result comparison module 213 to work.

When the delay path length of an initial delay path circuit is set to zero, the phases of the two pulse signals are same; when the delay path length increases gradually, the phases of the two pulse signals deviate gradually; and when the delay path length increases to a certain value, the deviation of the phases of the two pulse signals reaches 180°, that is, the high and low potentials of the two signals are opposite, at this time, it is judged that the speed detecting circuit is not able to work normally, and the number of delay stages acquired at the moment can be used as the data of the working behavior of the speed detecting circuit.

Preferably, according to one embodiment of the present disclosure as shown in FIG. 4, by means of inputting a preset voltage and a preset working frequency, as well as increasing the delay path length (stages of the delay unit), when the number of delay stages is increased to a certain quantity, it is judged that the speed detecting circuit 21 is not able to work normally, and the number of delay stages acquired at the moment can be used as the data of the working behavior of the speed detecting circuit. It reflects the working behavior of the speed detecting circuit under the current working condition, which can correspond to the working behavior of the target circuit under the current working condition.

The number of delay stages acquired by means of scanning by the speed detecting circuit 21 can correspond to the point of working voltage and working frequency of the target circuit; for example, if, at the point that the voltage is 1.2V, the number of delay stages scanned by the speed detecting circuit of the target circuit is 120, then the maximum stable working frequency of the target circuit corresponding to 1.2V is 450 MHz; while if, at the point that the voltage is 1.2V, the number of delay stages scanned by the speed detecting circuit of the target circuit is 150, the maximum stable working frequency corresponding to 1.2V is 500 MHz. The corresponding relation between the two can be determined by tests.

The multiple numbers of delay stages, acquired by means of scanning by the speed detecting circuit, can be divided into 4 different working behavior sections by means of classified statistical methods. For example, at the point that the voltage is 1.2V, the numbers of delay stages higher than 180 are located in section 1, and the numbers of delay stages between 180-150 are located in section 2, the number of delay stages between 150-120 are located in section 3 and the number of delay stages lower than 120 are located in section 4. Multiple delay stage number sections can correspond to the target circuit with multi-classifications of different working behaviors, namely correspond to multiple voltage-frequency corresponding relation curves of the target circuit in the lookup table (VF table). For example, section 1 corresponds to curve 1 in the VF table, and section 2 corresponds to curve 2 in the VF table, and so on.

Preferably, the speed detecting circuit contains one or more sections, which respectively monitor one or more key parts of the target circuit that affect the running of the target circuit, that is, the sections of the speed detecting circuit are respectively disposed to be near to the key parts of the target circuit so as to acquire the same working condition; thereby being convenient for computing a result of the running of the target circuit through the detecting result of the speed detecting circuit.

The converting module 3 will be described in details according to one embodiment of the present disclosure as follows:

When the target circuit executes a working task under the current condition, the converting module 3 acquires the target frequency value required to execute the working task, and according to the target frequency value and the voltage-frequency corresponding relation curve selected by the scanning module 2, the converting module 3 computes the target voltage value required to execute the working task.

When the target circuit requires to operate an application under the current condition, the target frequency value required by the target circuit under the current condition is acquired, and after a voltage-frequency corresponding relation curve under the current condition is selected from the VF table by the scanning module 2, the target voltage value required for the normal running of the target circuit at the target frequency under the current condition is computed and converted according to the voltage-frequency corresponding relation curve herein.

The voltage-frequency corresponding relation curve under the current condition is selected according to the result obtained by scanning for status by the speed detecting circuit 21 of the scanning module 2.

Preferably, the converting module 3 includes a target frequency acquiring module 31, configured to acquire the required target frequency value when the target circuit is required to execute a working task.

The current working frequency and target working frequency of the target circuit can be respectively computed by the target frequency acquiring module 31 by means of monitoring changes of the clock configuration information of the target circuit, such as changes of clock source selection, frequency configuration of clock source, and clock frequency division setting, and so on, with reference to the current clock configuration information of the target circuit and the information of the clock configuration required to execute the next work task. For example, the target circuit currently selects a phase-locked loop as the clock source; an input frequency of the phase-locked loop is 24 MHz, the VOC frequency multiplication factor is 64, the post-divider factor is 4, and the clock frequency division of the target circuit is set to 3, then the current working frequency of the target circuit is 24×64÷4÷3=128 MHz. At a certain time point, the post-divider factor of the phase-locked loop in the clock configuration information of the target circuit is modified to 2 by software, and the clock frequency division of the target circuit is changed to 2, then the target working frequency of the target circuit required to execute the next work task is 24×64÷2÷2=384 MHz.

Therefore, the target frequency acquiring module 31 needs to record the current clock configuration information of the target circuit and the information of the clock configuration required to execute the next work task, so as to calculate the current working frequency and target working frequency of the target circuit.

The target voltage value refers to the required voltage value making the target circuit working normally with the target frequency value. The target voltage value is related to the target frequency value of the target circuit, and is related to individual characteristics of the target circuit and working conditions.

Preferably, according to one embodiment of the present disclosure, the target voltage value is computed, according to the target frequency value, through the voltage-frequency corresponding relation curve under the current condition.

When the target circuit switches from one working condition to another working condition (for example, from the standby mode to the working mode), or needs to enable or disable an application (for example, enable or disable video display), or runs at different stages during running a certain application (for example, during internet downloading), because of different performance requirements, the target circuit is required to switch from one working frequency to another working frequency, which are called as initial frequency and target frequency in this embodiment of the present invention. Since in process of adjusting the working frequency of the target circuit from the initial frequency to the target frequency, multiple factors that affect the frequency, such as clock source selection, source frequency, and frequency division coefficient and so on, are allowed to change, changes of different factors may cause the working frequency of the target circuit deviating from the target frequency. The working frequency of the target circuit, which is different from the initial frequency and the target frequency, caused by changes of different factors, is called as intermediate frequency.

As shown in FIG. 1, according to the initial frequency, the target frequency and the intermediate frequency, the converting module 3 acquires the initial voltage, the intermediate voltage and the target voltage by means of checking the voltage-frequency corresponding relation curves in the VF table.

Alternatively, the initial voltage can be acquired through user input or from a status register.

For example, the current working condition of the target circuit corresponds to curve 2 as shown in FIG. 3, when an application program starts, the initial frequency is 24 MHz, the intermediate frequency is 200 MHz and the target frequency is 500 MHz, and according to curve 2 the minimum initial voltage is 0.8 v, the minimum intermediate voltage is 0.8 v and the minimum target voltage is 1.4 v. According to the three voltages, it can be concluded that the maximum voltage in the whole process of adjustment is 1.4 v, thereby the target voltage is 1.4 v.

The combined adjusting module 4 will be described in details according to one embodiment of the present disclosure as follows:

According to the relative difference between the current frequency value of the target circuit and the target frequency value, and the relative difference between the current voltage value and the target voltage value, the combined adjusting module 4 combinedly adjusts the working frequency and the working voltage of the target circuit in a preset sequence smoothly.

The process of combinedly adjusting the working frequency and the working voltage of the target circuit smoothly herein: 1) includes one or more times of processes of adjusting frequency, and may include one or more times of processes of adjusting voltage;

Or 2) includes one or more times of processes of adjusting frequency and voltage in a preset sequence set in the scheduling unit;

Or 3) the one or more times of processes of adjusting frequency and voltage included herein sufficiently prevent the clock system and power supply system of the target circuit from being impacted due to the adjusting process.

After the target frequency acquiring module 31 detects changes of information of the working frequency of the target circuit, and computes the intermediate frequency, the target frequency, the intermediate voltage and the target voltage, the combined adjusting module 4 is started to combinedly adjust the working voltage and the working frequency.

Preferably according to one embodiment of the present disclosure as shown in FIG. 1, the combined adjusting module 4 includes a scheduling unit 41, a frequency adjusting unit 42 and a voltage adjusting unit 43.

The scheduling unit 41 is configured to call the frequency adjusting unit 42 and the voltage adjusting unit 43 to combinedly adjust the working voltage and the working frequency in a preset sequence smoothly.

The frequency adjusting unit 42 is configured to smoothly adjust the working frequency of the target circuit by means of adjusting clock source selection, source frequency, frequency division coefficient, or clock gating of the target circuit, and so on.

Preferably, by means of smoothly adjusting, the harmful impacts to the clock system and power supply system will be lowered as much as possible.

When the frequency adjusting unit 42 adjusts the frequency of the target circuit, since in the process of adjusting the working frequency of the target circuit from the initial frequency to the target frequency, multiple factors that affect the frequency, such as clock source selection, source frequency, and frequency division coefficient and so on, are allowed to change, the changes of different factors may cause the working frequency of the target circuit deviating from the target frequency, that is, an intermediate frequency may appear; while in the process of adjusting frequency, there will not be any frequency which is beyond the maximum frequency allowed to work at the current voltage; in the process of adjusting frequency, there will not be any sharp pulse in the target circuit clock which causes the target circuit unable to work; and in the process of adjusting frequency, if there is a great change between a preceding frequency (first frequency) and a subsequent frequency (second frequency), and the difference value between the second frequency and the first frequency is larger than the maximum value of the frequency change allowed by the target circuit, then the frequency adjusting unit will employ a frequency smoothly adjusting method to smoothly switch the working clock of the target circuit from the first frequency to the second frequency, otherwise the frequency adjusting unit will directly switch the clock frequency of the target circuit to the second frequency.

Figure 5:
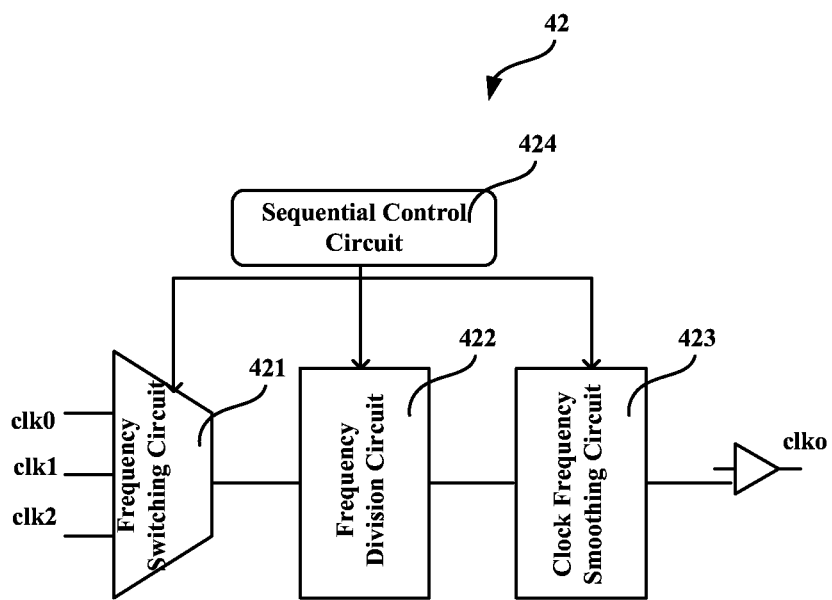
FIG. 5 is a structure diagram illustrating the frequency adjusting unit as shown in FIG. 1.

Preferably, as shown in FIG. 5, the frequency adjusting unit 42 includes a frequency switching circuit 421, a frequency division circuit 422, a clock frequency smoothing circuit 423 and a corresponding sequential control circuit 424.

Figure 6:
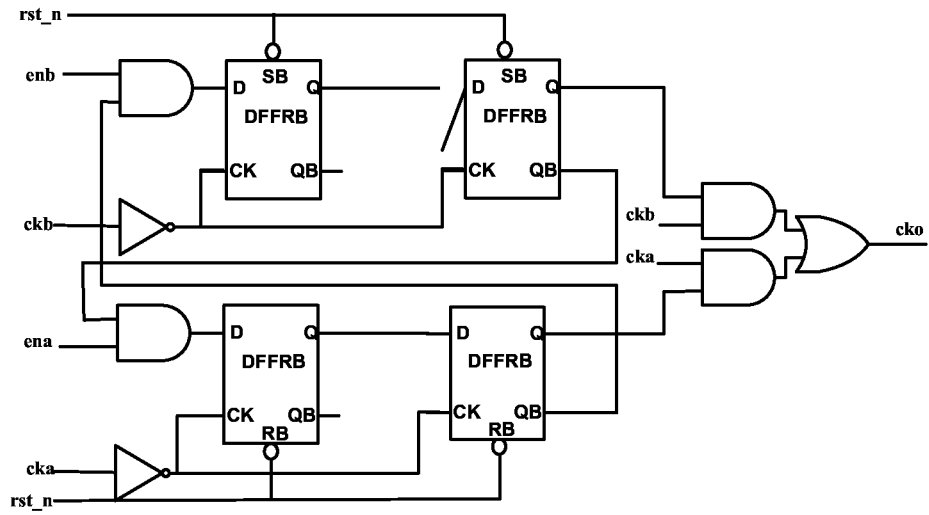
FIG. 6 is a structure diagram illustrating the frequency switching circuit as shown in FIG. 5.

Wherein, the frequency switching circuit 421 is a clock switching circuit configured to switch the working clock of the target circuit among multiple clock sources. Preferably, according to one embodiment of the present disclosure, the clock switching circuit as shown in FIG. 6 follows the principle of "first off and then on", thereby ensuring that abnormal signals affecting the normal running of the target circuit, such as burr pulse or narrow pulse and so on, will not appear in the output clock.

The frequency division circuit 422 is a high speed frequency division circuit with a dynamically configurable frequency division coefficient $1\sim2^n$, configured to divide and buffer the frequency, also to smooth the frequency.

Figure 7:
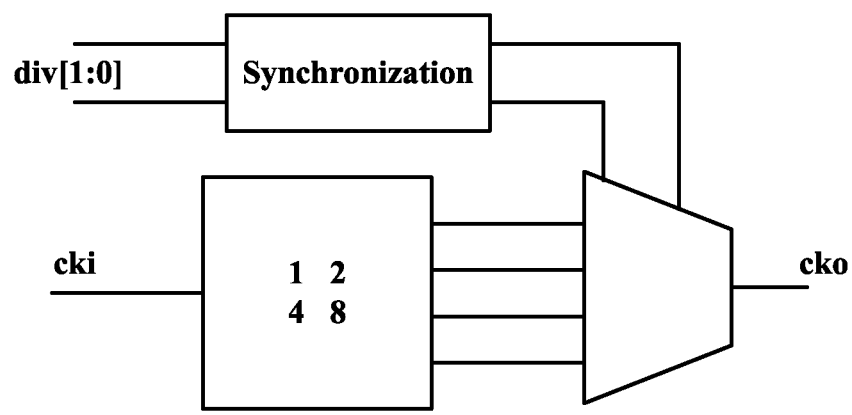
FIG. 7 is a structure diagram illustrating the frequency division circuit as shown in FIG. 5.

Preferably, according to one embodiment of the present disclosure as shown in FIG. 7, the frequency division circuit is a high speed frequency division circuit with a dynamically configurable coefficient 1/2/4/8, mainly including a binary divide-by-8 frequency divider, a frequency coefficient synchronous circuit and an output clock selecting circuit. The frequency coefficient synchronous circuit adopts a divide-by-8 clock to synchronize changes of the external frequency coefficient with the output clock, and then applies the synchronized frequency coefficient to select the output clock. Therefore, the frequency coefficient, synchronized by an internal clock, can be dynamically changed without affecting the safety of the output clock.

The clock frequency smoothing circuit 423 is a clock gating control circuit, which can dynamically adjust the pass rate of the clock gating. The principle is that, by means of controlling the clock gating, a part of the clock pulses pass the clock gating control circuit while another part of the clock pulses are shut off, so that the quantity of the output clock pulses is reduced, thereby achieving the effect of reducing the output frequency. For example, when a divide-by-8 frequency clock cycle is taken as a complete cycle, the number of output clock pulses selected from the 8 clock pulses can be only 1, or 2, or until to 8, and the corresponding output frequency is equal to 1/8, or 2/8, or until to 8/8 of the input frequency. Compared to a common integer frequency division circuit, the clock frequency smoothing circuit herein can achieve a higher accuracy in adjusting output clock frequency. The output frequency select bit of the sequential control circuit is synchronized by an internal input clock; thereby the select bit can be dynamically changed without affecting the safety of the output clock.

The sequential control circuit 424 is configured to coordinate relations among the frequency switching circuit 421, the frequency division circuit 422 and the clock frequency smoothing circuit 423, so as to control the sequence relevance of dynamic changes of every coefficient, and control the delay and wait among changes of every coefficient.

In a switching process from the initial frequency to the target frequency, for safety reasons, the process of switching frequency can be divided into several steps according to the embodiment of the present invention.

Preferably, assuming that some clock sources of the target circuit do not support dynamically adjustment of frequency, when adjusting the frequency of these clock sources, the source frequency is required to be switched to another stable frequency point, and then the clock source is adjusted, and the source frequency will not be switched back to the original clock source until the original clock source is stable. In this case, when adjusting the frequency, the frequency may need to be transited from other points of intermediate frequencies which are higher than the initial frequency and the target frequency.

Preferably, in a switching process from the initial frequency to the target frequency, the clock source and frequency division coefficient are required to be switched simultaneously. The switching process is required to be divided into several steps, so as to prevent high frequency clock, higher than the expected frequency, from appearing in a short time due to validate time error of simultaneously switching. For example, the switching process is divided into following steps: adjusting the clock frequency to change to be smaller firstly and later adjusting the clock frequency to change to be larger.

In this embodiment of the present invention, in the process of switching from the initial frequency to the target frequency, a method of smoothly adjusting frequency is adopted, so as to prevent the clock system and the power supply system of the target circuit from destructively fluctuating due to that the change of the frequency is beyond the maximum value allowed by the target circuit.

As shown in the embodiment mentioned above, assuming both of the 24 MHz clock source and the 500 MHz clock source come from the clock source clk0, and the 200 MHz clock source comes from the clock source clk1, and neither clk0 nor clk1 supports dynamical adjustment.

The threshold for starting the method of smoothly adjusting working frequency is that the target frequency is at least 200 MHz larger than the initial frequency, and the step length of smoothly adjusting each time is no larger than 200 MHz. Therefore, in this embodiment, it is not necessary to employ the method of smoothly adjusting working frequency for the first time of adjusting the frequency in the step S3 of the method of combined adjusting the working voltage and the working frequency of the target circuit, and the specific process herein is as follows: starting the clk1 and setting the frequency of the clk1 to 200 MHz (this step is omitted if the clk1 has already been set successfully), waiting until the clk1 is stable, and then switching the clock source to the clk1.

It is necessary to employ the method of smoothly adjusting working frequency for the second time of adjusting the frequency, and the specific process herein is as follows: setting the frequency of the clk0 to 500 MHz; waiting until the clk0 is stable; switching the clock source to the clk0 and starting the smoothly adjusting circuit; setting the frequency to a certain intermediate frequency (such as 375 MHz) through the clock gating; waiting until the fluctuation of the external power supply system, caused by working frequency hopping, settles down, wherein the waiting time is determined by characteristics of the power supply system; setting the clock gating rate to 100%, that is, setting to the target frequency, waiting for a while and ending the adjustment.

The voltage adjusting unit 43 is configured to adjust the voltage of power supply system of the target circuit in a specific sequence.

Preferably, according to one embodiment of the present disclosure, the voltage adjusting unit 43 can directly adjust the voltage of the power supply system of the target circuit via a certain preset communication protocol, such as general signal input/output interface or a signal group with a special protocol, and so on.

Preferably, the process of adjusting the voltage of the power supply system by the voltage adjusting unit conforms to the requirements of the power supply system of the target circuit, therefore it will not cause the destructive fluctuation of the power supply system of the target circuit and will not affect the normal running of the target circuit.

Preferably, in the circuit control system for dynamically adjusting voltage and frequency according to one embodiment of the present disclosure, the power supply to the target circuit is implemented by a power management module (not shown), and the power management module communicates with the voltage adjusting unit via a general communication protocol (such as I2C).

Preferably, the voltage adjusting unit includes a communication interface, a communication interface control circuit and a voltage adjusting process control circuit.

The working voltage adjusting circuit can adjust the power supply voltage of the power management module through the communication interface via communication protocols.

The communication interface control circuit is configured to convert control information sent from the voltage adjusting process control circuit into a standard protocol signal of the communication interface, and send the standard protocol signal herein to the power management module; in the meantime, the communication interface control circuit can interpret the status signals sent from an external power management chip and send the status signals to the voltage adjusting process control circuit. For example, the communication interface control circuit converts the voltage adjusting instruction sent from the voltage adjusting process control circuit into an I2C protocol signal, and then sends it to the external power management module via the I2C-bus. Or, the communication interface control circuit sends the status reading instruction of the power management module via the I2C-bus, so as to read the specific status information of the external power management module and send it back to the voltage control circuit. For the detailed process of generating the I2C protocol signal and the detailed process of communicating, please refer to the I2C protocol specification.

The communication interface control circuit may adopt a general communication interface controller, such as an I2C interface controller.

The voltage adjusting process control circuit is configured to generate communication instructions and status sequences, and execute delay controlling among sequences. For example, a voltage adjusting process to the power management module can include several steps such as reading current voltage supply status of the target circuit by the management unit, setting new voltage supply for the target circuit, reading voltage supply status after setting new voltage supply for the target circuit, and so on. In order to prevent the target circuit from being impacted due to the power adjustment, there should be a certain period of time delay after a new voltage supply for the target circuit is set. The communication mode of each instruction relies on the I2C protocol and the interpretation of the I2C protocol by the power management module.

The constitution of the communication instruction sequences generated by the voltage adjusting process control circuit and the time length of delay/wait are determined by the characteristics of the power management module.

For example, in this embodiment of the present disclosure, the voltage setting for the power management module can be realized by several operations such as writing device number of the power management module, writing voltage supply serial number, writing target voltage, and reading voltage status through the communication interface, and so on.

Preferably, the circuit control system for dynamically adjusting voltage and frequency further includes a combined control module 5, configured to execute combined control on adjustment of the working voltage and the working frequency of the target circuit.

The combined control module 5 controls the lookup table module 1, the scanning module 2, the converting module 3 and the combined adjusting module 4, and at the end of combinedly adjusting the working voltage and the working frequency of the target circuit, the combined control module outputs an adjusting result and informs the adjusting result to a user.

The combined control module 5 controls application requirements of the target circuit. The combined control module 5 serial connects the lookup table module 1, the scanning module 2, the converting module 3 and the combined adjusting module 4; controls the startup sequences of every module according to the application requirements, and transmits the working status and the result among every module, thereby achieving the dynamical adjustment of the working voltage and the working frequency of the target circuit.

The combined control module 5 outputs an adjusting result and informs the result to a user. By means of the interrupting or status outputting mode, the combined control module 5 informs the user the adjusting result (success or failure) of the working voltage and working frequency of the target circuit and the corresponding status, which is convenient for the user to know current status of the target circuit more accurately, and to handle and repair the error conditions caused by various kinds of probabilistic abnormity of the target circuit (such as a voltage adjusting error caused by external abnormal electrical impulses).

Preferably, according to one embodiment of the present disclosure, the combined control module 5 is an interrupting and status handling circuit, configured to control the combined working of every module, recording correct information and error information in adjusting process, and informing the user by manners such as interrupting, and so on. For example, the combined control module 5 informs the user the current voltage and current frequency if the adjusting process ends correctly; or when the power management module is not able to respond to the adjusting instruction of the voltage adjusting process control circuit due to some special reasons, the combined control module 5 informs the user information such as failure modules and failure reasons, initial voltage recorded and initial frequency recorded, and target voltage and target frequency, and so on.

Figure 8:
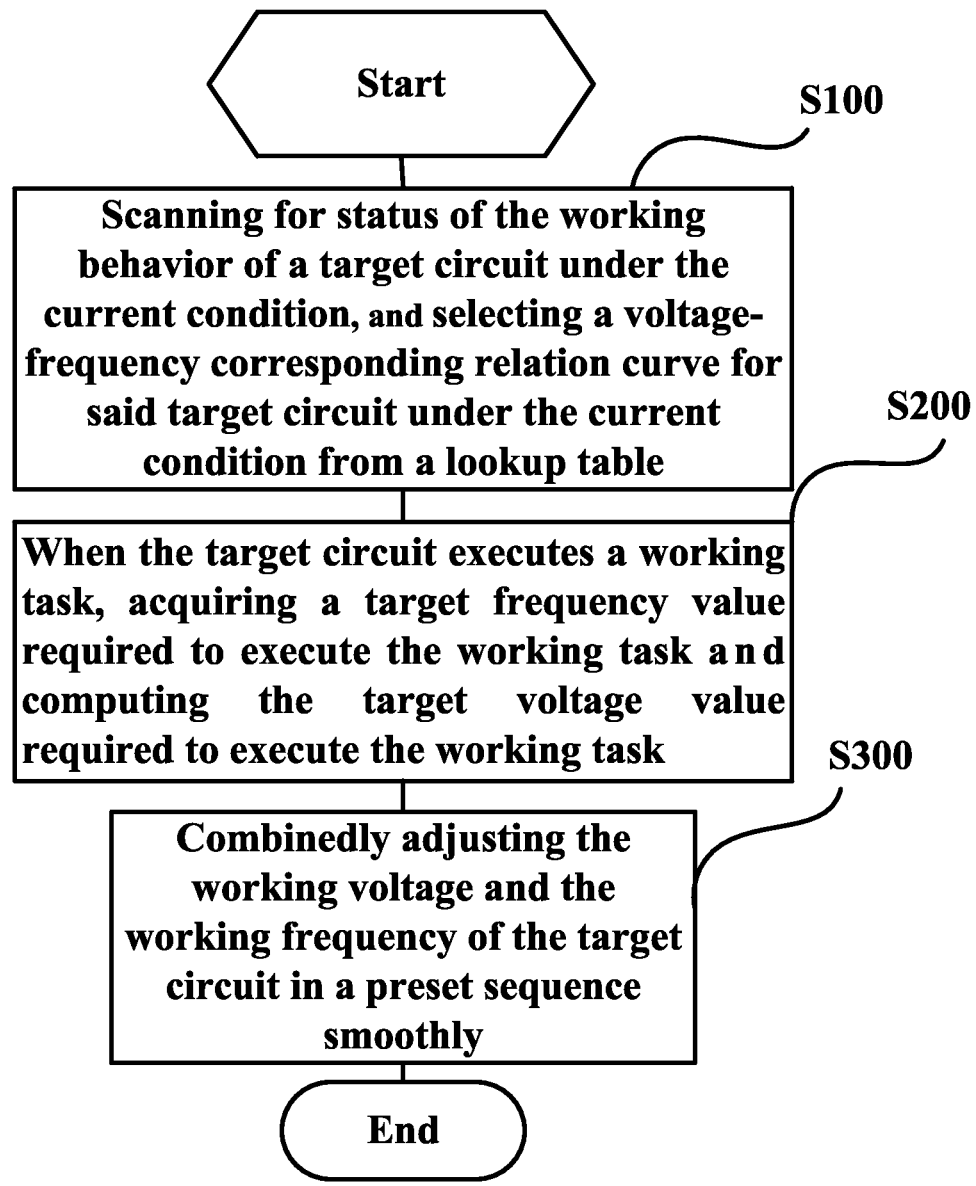
FIG. 8 is a flow diagram illustrating the circuit control method for dynamically adjusting voltage and frequency according to one embodiment of the present disclosure.

The working process of the circuit control method for dynamically adjusting voltage and frequency according to one embodiment of the present disclosure will be described in more details. According to one embodiment as shown in FIG. 8, the circuit control method includes following steps:

S100, scanning for status of the working behavior of a target circuit under the current condition, and according to a result of said scanning for status or directly according to a preset result, selecting a voltage-frequency corresponding relation curve for said target circuit under the current condition from a lookup table;

Preferably, the process of scanning for status is as follows: making use of the variation characteristics of factors of the speed detecting circuit, such as input frequency or input voltage or delay path, and so on, by means of adjusting from stage to stage the input frequency or input voltage or delay path of the speed detecting circuit, judging to acquire a result whether the speed detecting circuit is able to work normally or not able to work normally.

The variation characteristics herein refer to that, based on the characteristics of the speed detecting circuit, when any factor (such as input frequency or input voltage or delay path of the speed detecting circuit and so on) changes, the result whether the speed detecting circuit is able to work normally or not able to work normally will change directionally, thus the change of the result is predictable. For example, when the speed detecting circuit can work normally at a certain input voltage, in the case that the other conditions are unchanged, the working speed of the speed detecting circuit will be increased with input voltage increasing, and it can be inferred that the speed detecting circuit can work normally. For another example, the speed detecting circuit can work normally when the delay path is in a certain stage, in the case that the other conditions are unchanged, the maximum working frequency of the speed detecting circuit will be reduced by increasing the number of delay path stages of the speed detecting circuit, and it can be inferred that the speed detecting circuit may be not able to work normally.

Preferably, according to one embodiment of the present disclosure, the result whether the speed detecting circuit is able to work normally or not able to work normally may be a value or a range.

According to the value or the range herein, the result whether the target circuit is able to work normally or not able to work normally under a preset condition can be computed, which means the maximum working frequency of the target circuit under the preset condition (for example at a preset voltage, a preset temperature), or the minimum working voltage of the target circuit under the preset condition (for example at a preset frequency, a preset temperature) can be inferred.

The result whether the target detecting circuit is able to work normally or not able to work normally under the preset condition computed by the speed detecting circuit after scanning for status is finally reflected in selection of the curve from the VF table, which means, according to the result computed by the speed detecting circuit after scanning for status, the scanning module selects a corresponding voltage-frequency corresponding relation curve from the lookup table to be as a reference curve for combinedly adjusting the working voltage and the working frequency of the target circuit under the preset condition.

Preferably, the speed detecting circuit adjusts its delay path length at the set working voltage and working frequency, and judges the working result, thereby detecting whether the target circuit is able to work normally or not able to work normally under the preset condition, namely the working behavior of the target circuit.

Preferably, the delay judging process by the speed detecting circuit includes following steps:

S110, generating several multi-periodic pulse signals with a duty ratio of 50% according to an input clock signal, and the pulse signals pass two different path circuits, which are a non-delay path circuit and a delay path circuit of the delay path module, and then arrive at the result comparison module respectively;

S120, comparing between the phase of the pulse signal having passed the non-delay path circuit and that of the pulse signal having passed the delay path circuit;

S130, when the delay path length of an initial delay path circuit is set to zero, two pulse signal phases are the same;

when the delay path length increases gradually, the two signal phases deviate gradually; and when the delay path length increases to a certain value, the deviation of the two signal phases reaches 180°, namely the high and low potentials of the two signals are opposite, at this time, it is judged that the speed detecting circuit is not able to work normally, and the delay stage number acquired at the moment can be used as the data of the working behavior of the speed detecting circuit.

S200, under the current condition, when the target circuit executes a working task, acquiring a target frequency value required to execute the working task, and according to the target frequency value and the voltage-frequency corresponding relation curve selected, computing the target voltage value required to execute the working task.

Preferably, according to one embodiment of the present disclosure, said computing the target voltage value required includes following steps:

Selecting a curve from the voltage-frequency table as a voltage-frequency corresponding relation curve under the current working condition through the voltage-frequency corresponding relation curve select bit, extracting each of working frequency values corresponding to each of working voltage values in the curve, and then comparing the input frequency value to each of working frequency values corresponding to each of working voltage values, and acquiring the minimum working voltage value required for normally working at the input frequency under the current working condition.

S300, according to the corresponding relation between the frequency value of the target circuit under the current condition and the target frequency value, and the corresponding relation between the voltage value of the target circuit under the current condition and the target voltage value, combinedly adjusting the working voltage and the working frequency of the target circuit in a preset sequence smoothly.

Figure 9:
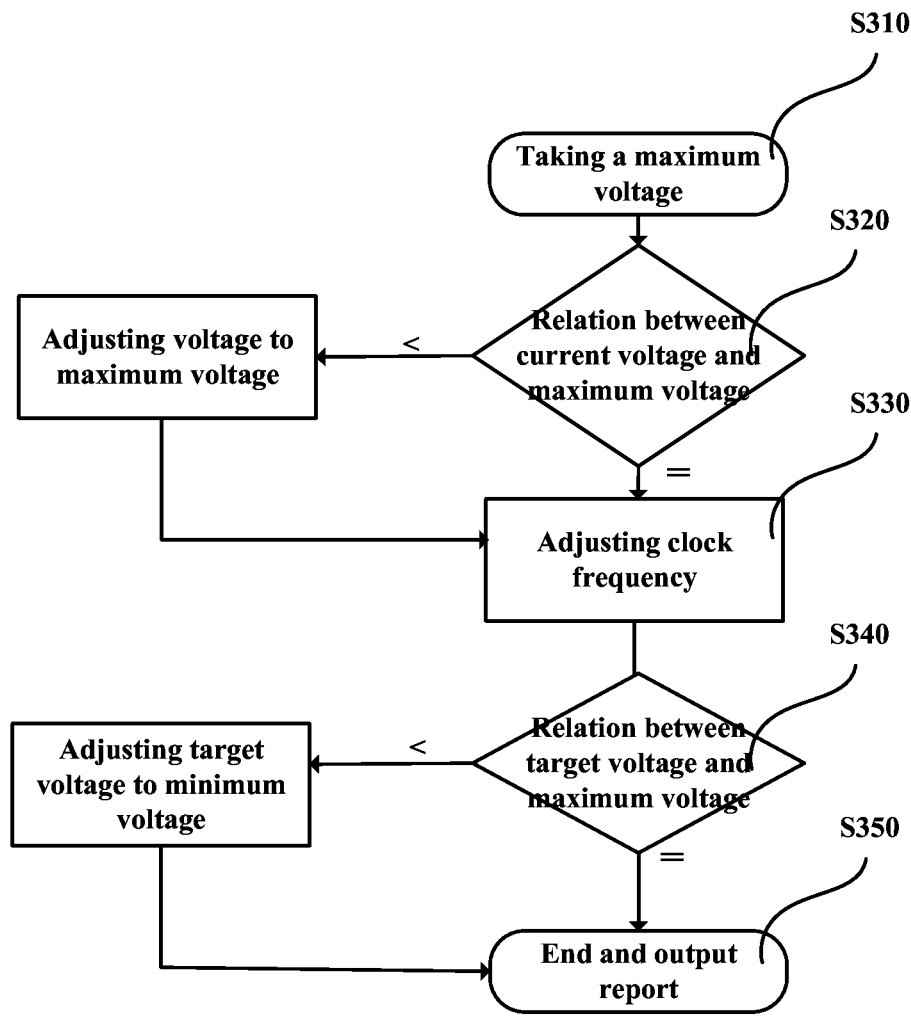
FIG. 9 is a flow diagram illustrating the process of adjusting frequency and adjusting voltage in the step S300 as shown in FIG. 8.

Preferably, according to one embodiment of the present disclosure as shown in FIG. 9, the step S300 includes following steps:

S310, comparing the current voltage value corresponding to the current frequency of the target circuit, the target voltage value corresponding to the target frequency, and the intermediate voltage value corresponding to the intermediate frequency introduced in the process of adjusting frequency, and taking the maximum value among the three values as the maximum voltage in the process of adjusting;

S320, when starting to combinedly adjust working voltage and the working frequency of the target circuit, judging whether the current voltage value is lower than the maximum value first;

if it is, then adjusting the working voltage value of the target circuit to the maximum voltage value, and then turning to S330;

if it is not, then turning to S330 directly;

S330, adjusting the working frequency of the target circuit to the target frequency;

S340, judging whether the target voltage value of the target circuit is lower than the maximum voltage value, if it is, then adjusting the working voltage of the target circuit to the target voltage, and then turning to step S350; if it is not, then turning to step S350 directly; and S350, ending the adjustment.

As illustrated in the embodiment mentioned above, the process of combinedly adjusting the working voltage and the working frequency is divided into three steps: step 1, adjusting the working voltage from 0.8V to 1.4V; step 2, adjusting the working frequency from 24 MHz to 200 MHz; and step 3, adjusting the working frequency from 200 MHz to 500 MHz.

Preferably, the process of combinedly adjusting the working voltage and the working frequency adopts a frequency division gradually reduced method, or a gating method.

Preferably, according to one embodiment of the present disclosure, the method of smoothly adjusting frequency includes following steps:

according to the difference value between the first frequency and the second frequency, dividing up, from low value to high value, several points of intermediate frequencies located between the first frequency and the second frequency; and in the process of switching frequency, increasing the working frequency of said target circuit gradually, so that the working frequency is adjusted to each of the intermediate frequencies and finally to the second frequency.

By means of the method of smoothly adjusting frequency according to one embodiment of the present disclosure, the change value of the working frequency of the target circuit every time is no more than the allowed maximum frequency change value, thereby avoiding dramatic changes on working frequency of the clock of the target circuit, and avoiding dramatic changes on the power consumption and harmful impacts to the clock system and power supply system of the target circuit.

The selection of the maximum frequency change between the first frequency and the second frequency which triggers the frequency smoothly adjusting method, and the intermediate frequencies rely on the working condition of the target circuit, especially the power supply system.

The difference value between the first frequency and the second frequency which triggers the frequency smoothly adjusting method, and the difference values between the first frequency and each of intermediate frequencies, and the difference values between the second frequency and each of intermediate frequencies are set to no larger than a preset maximum value of the frequency change allowed by the target circuit, so that harmful impacts to the power supply system will not be generated due to the power consumption changes caused by working frequency changes of the target circuit. The preset maximum value of the frequency change may be a fixed value, or may be dynamically changed through software according to application requirements.

The circuit control system and method for dynamically adjusting voltage and frequency of the present disclosure have a high degree of automation of hardware without increasing the complexity of application software; harmful impacts to a clock system and a power supply system will be lowered as much as possible, thereby ensuring the safety; and an optimized energy saving solution is provided according to individual characteristics of the target circuit, performance and power consumption characteristics in different applications.

It should be understood by those skilled in the art that what described above are preferred embodiments of the present invention. Various modifications and replacements may be made therein without departing from the theory of the present disclosure, which should also be seen in the scope of the present disclosure.

What is claimed is:

1. A circuit control system for dynamically adjusting voltage and frequency, comprising a lookup table module, a converting module, a combined adjusting module, and a scanning module, wherein:

said lookup table module is configured to store a combined table of voltage-frequency corresponding relation curves of a target circuit under one or more working conditions;

said converting module is configured to make conversion between a working voltage and a working frequency of said target circuit according to said lookup table module;

said scanning module is configured to execute scanning for status of the working behavior of said target circuit under the current condition, and according to a result of said scanning for status, select a voltage-frequency corresponding relation curve from said lookup table module for said target circuit under the current condition, wherein, said scanning module comprises a speed detecting circuit, said scanning module is configured to execute scanning for status of working behavior of said target circuit under a preset condition by means of adjusting factors including input frequency, input voltage and delay path of the speed detecting circuit; and said combined adjusting module is configured to combinedly adjust the working voltage and the working frequency of said target circuit smoothly.

2. The circuit control system for dynamically adjusting voltage and frequency according to claim 1, further comprising a combined control module, configured to execute combined control on adjustment of the working voltage and the working frequency of said target circuit;

said combined control module controls the lookup table module, the scanning module, the converting module and the combined adjusting module; and at an end of combined adjustment of the working voltage and the working frequency of said target circuit, said combined control module outputs an adjusting result and informs said adjusting result to a user.

3. The circuit control system for dynamically adjusting voltage and frequency according to claim 2, wherein, said speed detecting circuit is configured to detect maximum working frequency of said target circuit under the current condition, or minimum working voltage of said target circuit under the current condition.

4. The circuit control system for dynamically adjusting voltage and frequency according to claim 3, wherein, said speed detecting circuit comprises a stimulus generating module, a delay path module and a result comparison module;

said stimulus generating module is configured to generate one or more multi-periodic pulse signals according to an input clock signal, and said pulse signals pass two different path circuits, which are a non-delay path circuit and a delay path circuit of said delay path module, and then arrive at said result comparison module respectively;

said delay path module, containing the delay path circuit, is configured to delay pulse signals, or compute input signals; and said result comparison module is configured to compare between a phase of the pulse signal having passed the non-delay path circuit and that of the pulse signal having passed the delay path circuit.

5. The circuit control system for dynamically adjusting voltage and frequency according to claim 3, wherein, said speed detecting circuit contains one or more sections, which respectively monitor one or more key parts of said target circuit that affect running of said target circuit.

6. The circuit control system for dynamically adjusting voltage and frequency according to claim 3, wherein, said combined adjusting module comprises a scheduling unit, a frequency adjusting unit and a voltage adjusting unit;

said scheduling unit is configured to call the frequency adjusting unit and the voltage adjusting unit to combinedly adjust the working voltage and the working frequency in a preset sequence smoothly;

said frequency adjusting unit is configured to smoothly adjust working frequency of said target circuit by means of adjusting clock source selection, source frequency, frequency division coefficient, and clock gating of said target circuit; and said voltage adjusting unit is configured to adjust voltage of a power supply system of said target circuit in a preset sequence.

7. The circuit control system for dynamically adjusting voltage and frequency according to claim 6, further comprising a power management module, configured to supply voltage for said target circuit.

8. A circuit control method for dynamically adjusting voltage and frequency, comprising following steps:

step A, scanning for status of working behavior of a target circuit under the current condition, and according to a result of said scanning for status or directly according to a preset result, selecting a voltage-frequency corresponding relation curve for said target circuit under the current condition from a lookup table containing voltage-frequency corresponding relation curves of the target circuit under one or more working conditions, wherein, said scanning for status comprises: according to variation characteristics of factors including input frequency, input voltage and delay path of a speed detecting circuit, judging to acquire a result whether the speed detecting circuit is able to work normally or not able to work normally, by means of adjusting said factors from stage to stage;

step B, under the current condition, when said target circuit executes a working task, acquiring a target frequency value required to execute said working task, and according to said target frequency value and said voltage-frequency corresponding relation curve selected for said target circuit, computing a target voltage value required to execute said working task; and step C, according to a relative difference between a frequency value of said target circuit under the current condition and the target frequency value, and according to a relative difference between a voltage value of the target circuit under the current condition and the target voltage value, combinedly adjusting the working voltage and the working frequency of said target circuit in a preset sequence smoothly.

9. The circuit control method for dynamically adjusting voltage and frequency according to claim 8, wherein, in the step B, said according to said target frequency value and said voltage-frequency corresponding relation curve selected for said target circuit, computing a target voltage value required to execute said working task comprises following steps:

by means of the voltage-frequency corresponding relation curve select bit, selecting a voltage-frequency corresponding relation curve from said lookup table as a corresponding relation curve under the current working condition; extracting working frequency values corresponding to every working voltage value respectively on said curve; comparing an input frequency value to said working frequency values corresponding to every working voltage values; and acquiring a minimum voltage value required for normally running of the target circuit at the input frequency value under the current working condition.

10. The circuit control method for dynamically adjusting voltage and frequency according to claim 8, wherein, in step C, said according to a corresponding relation between a frequency value of said target circuit under the current condition and the target frequency value, and according to the corresponding relation between a voltage value of the target circuit under the current condition and the target voltage value, combinedly adjusting the working voltage and the working frequency of said target circuit in a preset sequence smoothly comprises following steps:

step C1, comparing a current voltage value corresponding to a current frequency of said target circuit, a target voltage value corresponding to the target frequency, and an intermediate voltage value corresponding to an intermediate frequency introduced in process of adjusting frequency, and taking a maximum value among the three values as a maximum voltage in process of adjusting;

step C2, when starting to combinedly adjust working voltage and the working frequency of said target circuit, judging whether the current voltage value is lower than said maximum value first;

if it is, then adjusting the working voltage value of said target circuit to said maximum voltage value, and then turning to step C3;

if it is not, then turning to step C3 directly;

step C3, adjusting the working frequency of said target circuit to the target frequency;

step C4, judging whether the target voltage value of said target circuit is lower than the maximum voltage value, if it is, then adjusting the working voltage of the target circuit to the target voltage, and then turning to step C5;

if it is not, then turning to step C5 directly; and step C5, ending the adjustment.

11. The circuit control method for dynamically adjusting voltage and frequency according to claim 10, wherein, in the step C, said combinedly adjusting the working voltage and the working frequency of said target circuit smoothly comprises following steps:

step C1', according to a difference value between a first frequency and a second frequency, dividing up, from low value to high value, several points of intermediate frequencies located between the first frequency and the second frequency; and step C2', in process of switching frequency, increasing the working frequency of said target circuit gradually, so that the working frequency is adjusted to each of said intermediate frequencies and finally to the second frequency.

12. The circuit control system for dynamically adjusting voltage and frequency according to claim 1, further comprising a combined control module, configured to execute combined control on adjustment of the working voltage and the working frequency of said target circuit;

said combined control module controls the lookup table module, the scanning module, the converting module and the combined adjusting module; and at an end of combined adjustment of the working voltage and the working frequency of said target circuit, said combined control module outputs an adjusting result and informs said adjusting result to a user.

13. The circuit control system for dynamically adjusting voltage and frequency according to claim 12, wherein, said combined adjusting module comprises a scheduling unit, a frequency adjusting unit and a voltage adjusting unit;

said scheduling unit is configured to call the frequency adjusting unit and the voltage adjusting unit to combinedly adjust the working voltage and the working frequency in a preset sequence smoothly;

said frequency adjusting unit is configured to smoothly adjust working frequency of said target circuit by means of adjusting clock source selection, source frequency, frequency division coefficient, or clock gating of said target circuit; and said voltage adjusting unit is configured to adjust voltage of a power supply system of said target circuit in a preset sequence.

14. The circuit control system for dynamically adjusting voltage and frequency according to claim 13, further comprising a power management module, configured to supply voltage for said target circuit.

\* \* \* \* \*